(12) United States Patent
Wind et al.

(10) Patent No.: US 8,535,419 B2
(45) Date of Patent: Sep. 17, 2013

(54) MODULAR AMINE PLANT

(75) Inventors: Glen Wind, Houston, TX (US); John Kenton Thompson, The Woodlands, TX (US); Lance Perryman, Whimberly, TX (US)

(73) Assignee: Zephyr Gas Services LLC, Houston, TX (US)

( * ) Notice: Subject to any disclaimer, the term of this patent is extended or adjusted under 35 U.S.C. 154(b) by 413 days.

(21) Appl. No.: 12/752,674

(22) Filed: Apr. 1, 2010

(65) Prior Publication Data

US 2010/0251897 A1    Oct. 7, 2010

Related U.S. Application Data

(60) Provisional application No. 61/165,896, filed on Apr. 1, 2009, provisional application No. 61/309,053, filed on Mar. 1, 2010.

(51) Int. Cl.
*B01D 53/14*    (2006.01)

(52) U.S. Cl.
USPC ............ 95/173; 95/174; 95/178; 95/183; 95/193; 95/209; 95/214; 95/236; 96/181; 96/24; 96/240; 96/242; 96/371; 423/228; 423/229

(58) Field of Classification Search
USPC ....... 96/181, 24, 240–242, 371; 95/173–174, 95/178, 183, 193, 209, 214, 236; 423/228–229
See application file for complete search history.

(56) References Cited

U.S. PATENT DOCUMENTS

| | | | |
|---|---|---|---|
| 2,089,082 A * | 8/1937 | Woodman | 254/103 |
| 3,435,590 A | 4/1969 | Smith | |
| 3,683,571 A * | 8/1972 | Walz et al. | 52/125.2 |
| 3,830,678 A * | 8/1974 | Behunin | 156/349 |
| 3,907,524 A | 9/1975 | Haines, Jr. | |
| 4,184,855 A * | 1/1980 | Butwell et al. | 95/174 |
| 4,253,851 A * | 3/1981 | Brooks et al. | 95/214 |
| 4,289,738 A | 9/1981 | Pearce et al. | |
| 4,393,816 A | 7/1983 | Bock | |
| 4,717,547 A | 1/1988 | Baritiu et al. | |
| 4,798,910 A * | 1/1989 | Herrin | 564/497 |
| 5,994,147 A * | 11/1999 | Rodriguez et al. | 436/163 |
| 6,416,568 B1 | 7/2002 | Wallace et al. | |
| 6,605,138 B2 | 8/2003 | Frondorf | |
| 6,740,230 B1 | 5/2004 | Hugo et al. | |
| 6,939,393 B2 | 9/2005 | Asprion et al. | |
| 7,004,997 B2 | 2/2006 | Asprion et al. | |

(Continued)

OTHER PUBLICATIONS

Zephyr 60 GPM Amine Unit—P & ID, dated Jun. 14, 2006.

(Continued)

*Primary Examiner* — Robert Clemente
*Assistant Examiner* — Minh-Chau Pham
(74) *Attorney, Agent, or Firm* — Greenberg Traurig, LLP

(57) ABSTRACT

A modular amine plant having a front-end module and a back-end module in fluid communication with each other. The front-end module having pre-fabricated connections for the association of various equipment including: a filter, an absorption tower, and a flash tank. The back-end module having pre-fabricated connections for the association of other various equipment including: a heat exchanger, a distillation tower, and a reboiler. The modular amine plant capable of being installed at a site in less than about 5 days. The modular amine plant further having moment forces sufficient to withstand wind speeds of about 100 miles per hour.

13 Claims, 4 Drawing Sheets

(56) References Cited

U.S. PATENT DOCUMENTS

| | | | |
|---|---|---|---|
| 7,018,450 B2* | 3/2006 | Rojey et al. | 95/193 |
| 7,144,555 B1 | 12/2006 | Squires et al. | |
| 7,695,702 B2 | 4/2010 | Rhodes et al. | |
| 8,070,863 B2* | 12/2011 | Tsangaris et al. | 96/108 |
| 2006/0191410 A1 | 8/2006 | Dolan et al. | |
| 2007/0157806 A1 | 7/2007 | Cash et al. | |
| 2007/0284240 A1 | 12/2007 | Rhodes et al. | |
| 2007/0286784 A1* | 12/2007 | Rhodes et al. | 423/228 |
| 2011/0256043 A1* | 10/2011 | Blair et al. | 423/228 |

OTHER PUBLICATIONS

Zephyr 60 GPM Amine Unit—Plans, Elevations and ISO view, dated Jul. 8, 2006.

Zephyr 60 GPM Amine Unit—P & ID; Dated Jun. 14, 2006; 2 pages; Installation Time Range from 6 to 60 Days; U.S.A.

Zephyr 60 GPM Amine Unit—Plans, Elevations, and ISO View; Dated Jul. 8, 2006; 3 pages; Installation Time Range from 6 to 60 Days; U.S.A.

* cited by examiner

MODULAR AMINE PLANT

CROSS REFERENCE TO RELATED APPLICATIONS

This application claims the benefit and priority of U.S. Provisional Patent Application No. 61/165,896 filed on Apr. 1, 2009 and U.S. Provisional Patent Application No. 61/309,053 filed on Mar. 1, 2010.

BACKGROUND OF THE INVENTION

1. Field of the Invention

The present disclosure relates generally to transportable modular amine plants, and in particular to substantially prefabricated amine plants that can be set up and installed quickly, safely, and efficiently.

2. Description of the Related Art

Amine plants have been used to remove carbon dioxide, hydrogen sulfide, particulates, and other miscellaneous impurities from raw natural gas. Typically such amine plants may be thought of as comprising two portions: an absorption portion and a regeneration portion. In the absorption portion, raw natural gas may be contacted with an amine solution to produce a "sweetened" gas stream (i.e., a gas stream substantially free of carbon dioxide and hydrogen sulfide) as a product, as well as an amine stream which is rich in the absorbed gases. The amine stream which is rich in the absorbed gases may be fed into the regeneration portion, wherein the amine may be separated from the absorbed gases. The "cleaned" amine may then be recycled into the absorption portion.

Prior amine plants were transported in multiple segments, by rail, truck, ship, or combinations thereof, and the segments were set up on a site having a raw natural gas source. These prior amine plants, however, often required clearing a construction area, pouring concrete, setting various equipment, including at least one distillation tower, in the concrete, and allowing the concrete to cure, as well as assembling the general plant piping and electrical components on site. Such prior amine plants often took at least a few days, and at times a few weeks, to set up and install before the process could be run safely and efficiently. Additionally, it often takes at least a few days, and at times a few weeks, to decommission, break down, and otherwise remove these prior amine plants.

SUMMARY OF THE INVENTIONS

In accordance with various illustrative embodiments hereinafter described, modular amine plants are disclosed. In an embodiment, a modular amine plant may include a front-end module having a filter affixed to the front-end module, an absorption tower affixed to the front-end module, optionally a scrubber affixed to the front-end module, and a flash tank affixed to the front-end module, as well as a back-end module in fluid communication with the front-end module. The modular amine plant may be set up in less than about 5 days, and may be capable of withstanding wind speeds of about 100 miles per hour, alternatively of about 120 miles per hour, alternatively of about 140 miles per hour.

In accordance with another illustrative embodiment of the present modular amine plant, is a modular amine plant having a front-end module and a back-end module in fluid communication with the front-end module. The back-end module includes a distillation skid, a reboiler skid, a cooling skid, and a pump skid. The distillation skid, reboiler skid, cooling skid, and pump skid may be affixed, or secured, to each other in a generally rectangular configuration. The front-end module may have a filter affixed to the front-end module, an absorption tower affixed to the front-end module, a scrubber affixed to the front-end module, and a flash tank affixed to the front-end module. The distillation skid may have affixed thereto a heat exchanger and a distillation tower. The reboiler skid may have a reboiler affixed thereto. The cooling skid may have a cooler and a condenser affixed thereto. The pump skid may have a main pump affixed thereto. Preferably, the present modular amine plant may be set up in less than about 5 days, and may have moment forces capable of withstanding wind speeds of about 100 miles per hour, alternatively of about 120 miles per hour, alternatively of about 140 miles per hour.

In accordance with a still further illustrative embodiment, is a modular amine plant having a front-end module and a back-end module in fluid communication with the front-end module. The back-end module may include a distillation skid, a reboiler skid, and a pump skid. The distillation skid, reboiler skid, and pump skid may be affixed to each other in a generally rectangular configuration. The front-end module may have affixed thereto a filter, an absorption tower, a scrubber, and a flash tank. The distillation skid may have a heat exchanger, a distillation tower, a cooler, and a condenser affixed thereto. The reboiler skid may have a reboiler affixed thereto, which may itself include a dampening weir, a level weir, and a splash weir. The pump skid may have a main pump affixed thereto. Preferably, the modular amine plant may be set up in less than about 5 days, and may have moment forces capable of withstanding wind speeds of about 100 miles per hour, alternatively of about 120 miles per hour, alternatively of about 140 miles per hour.

While the present modular amine plants will be described in connection with various preferred illustrative embodiments, and the appended drawings, it will be understood that it is not intended to limit the inventions to those embodiments. On the contrary, it is intended to cover all alternatives, modifications, and equivalents as may be included within the spirit and scope of the inventions as defined by the appended claims. As a non-limiting example, while FIGS. 1, 2, 3, and 4 illustrate respective amine plants 500, 500', and 500" having back-end modules 205, 205', and 205" comprised of one, four, and three skids, or platforms, respectively, amine plants having back-end module comprised of two, five, six, seven, or more skids are within the scope of inventions.

BRIEF DESCRIPTION OF THE DRAWING

The drawing figures are not to scale and certain features of the present modular amine plant are shown exaggerated in scale or in schematic form in the interest of clarity and conciseness, wherein.

DETAILED DESCRIPTION

Figure 1:
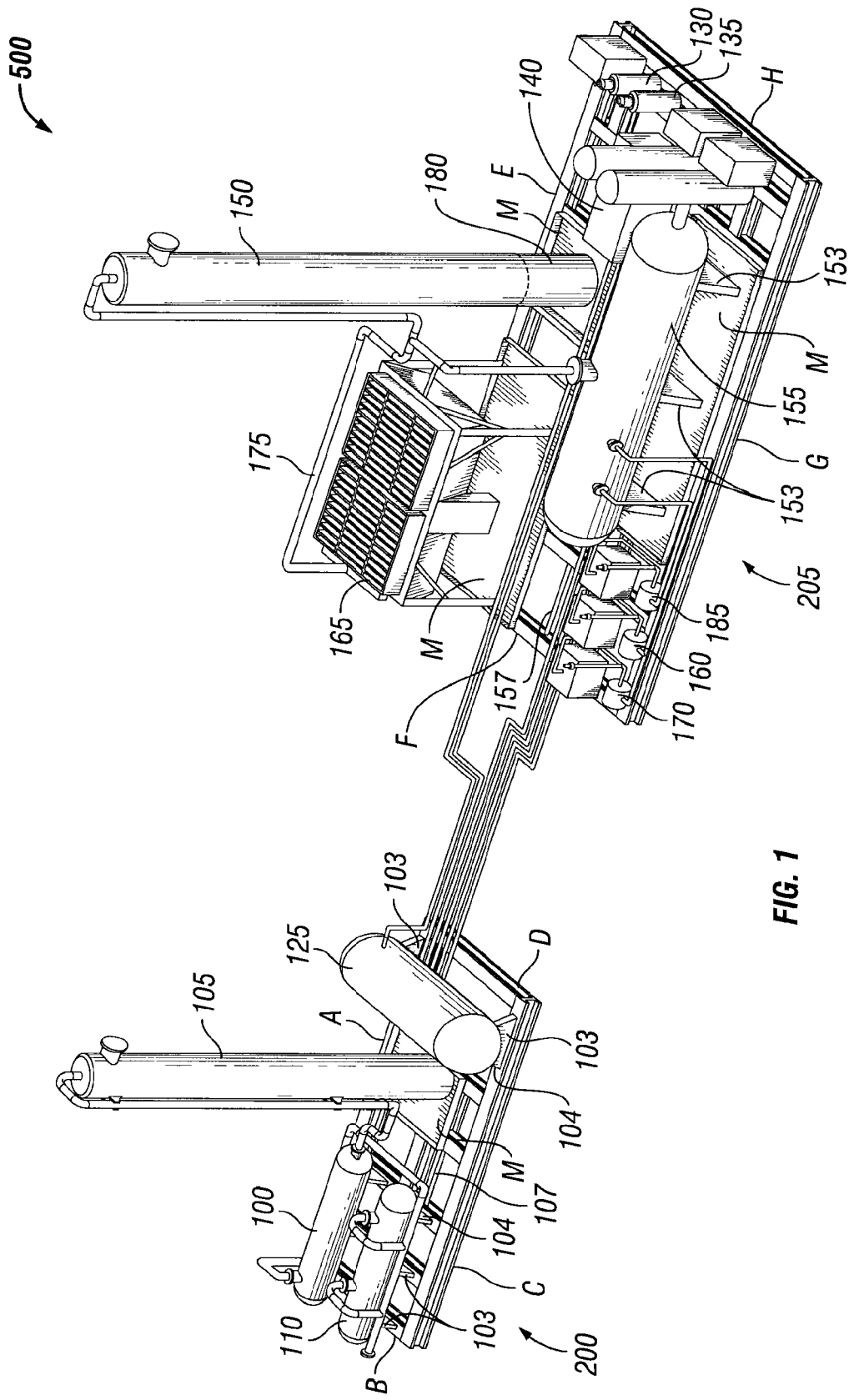
FIG. 1 is a perspective view of an illustrative embodiment of the present modular amine plant having a front-end module and a back-end module.
Figure 2:
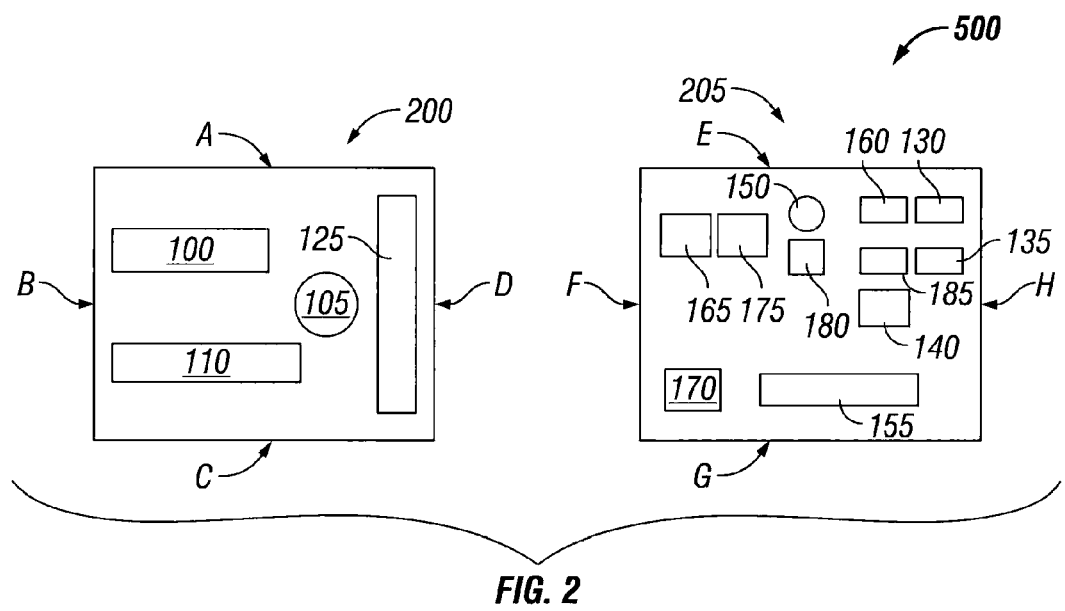
FIG. 2 is a schematic aerial, or top, view of an illustrative embodiment of the modular amine plant of FIG. 1.

FIG. 1 is a perspective view of an illustrative embodiment of the present modular amine plant 500, and FIG. 2 is a schematic top view of the illustrative embodiment of FIG. 1. With reference to FIGS. 1 and 2, the amine plant 500 comprises two modules: a front-end module 200 and a back-end module 205. Each module 200, 205 provides a skid-mounted frame for supporting the components of the amine plant 500. Each module 200, 205 may include a plurality of support members or beams, or I-beams, which form a supporting framework as will be hereinafter described in greater detail. The amine plant 500 may be of any size necessary to accommodate the desired natural gas production rate at any particular site having a raw natural gas source; however, preferable amine-water blend circulation rates of the amine plant 500 include about 3 gallons per minute, about 7.5 gallons per minute, about 30 gallons per minute, about 60 gallons per minute, about 100 gallons per minute, about 200 gallons per minute, about 300 gallons per minute, about 400 gallons per minute, about 500 gallons per minute, about 600 gallons per minute, about 700 gallons per minute, and about 800 gallons per minute, plus or minus ten percent.

Still with reference to FIGS. 1 and 2, the front-end module 200 may be formed by a framework that supports a plurality of pre-fabricated front-end equipment connections 103, such as various shaped support members 104 adapted to receive various types of equipment. Affixed to the plurality of pre-fabricated front-end equipment connections 103 may be at least the following equipment/vessels: a first filter 100 for removal of solid and liquid particulates; an absorption tower 105 for separation of gases such as carbon dioxide and hydrogen sulfide from natural gas; a scrubber 110 for the refinement of the clean natural gas; and a flash tank 125 for separation of gaseous phase fluids from liquid phase fluids. In various embodiments disclosed herein, use of the term "affixed" may encompass various meanings including but not limited to, two or more objects being mechanically fastened, joined, secured, or attached to each other, either directly, or through one or more intermediary objects, by temporary or permanent connections including bolts, welds, soldering, brazing, interconnecting plates, pins, and the like. Alternatively, the term "affixed" may mean that one object is supported by another object, either directly or through one or more intermediary objects.

In an embodiment, the location of vessels, instrumentation, and equipment affixed to the front-end module 200 may be configured such that there is a minimum fluid retention in the flash tank 125 of about 4 minutes, alternatively about 5 minutes, and/or to maximize recovery of volatile organic compounds, if any. In alternative embodiments, additional vessels, instrumentation, and equipment, such as for example an inlet meter (not shown) may be affixed to the front-end module 200, as within the scope of ordinary engineering practices. For example, with reference to FIG. 5, which is discussed in greater detail below, the front-end module 200 may include a feed line 300 for providing raw natural gas to the amine plant 500, as well as a second absorption tower inlet line 315 (FIG. 5) for providing amine to the amine plant 500. The feed line 300 may be affixed to the filter 100 and the second absorption tower inlet line 315 may be affixed to the absorption tower 105. The front-end module 200 and the back-end module 205 may be in fluid communication with each other such that a first filter inlet line 350 for conveying, or feeding, amine, carbon dioxide and hydrogen sulfide from the front-end module 200 to the back-end module 205. The liquid rich amine within the first filter inlet line 350 may be regenerated within the back-end module 205 through a distillation process such that regenerated amine may be recycled from the back-end module 205 through a regeneration line 410 to the front-end module 200. The carbon dioxide and hydrogen sulfide may be disposed of, recycled, further separated into product sulfur, or otherwise treated.

Continuing with reference to FIGS. 1 and 2, the back-end module 205 may be formed by a framework that supports a plurality of pre-fabricated back-end equipment connections 153, such as various shaped support members 154 adapted to receive various types of equipment. Affixed to the plurality of pre-fabricated back-end equipment connections 153 may be at least the following equipment/vessels: an amine stock filter 130; a charcoal filter 135; a heat exchanger 140; a distillation tower 150; a reboiler 155; a booster pump 160; a cooler 165; a main pump 170; a condenser 175; an accumulator 180; and a reflux pump 185. In alternative embodiments, additional vessels, instrumentation, and equipment such as for example a redundant booster pump (not shown) and a redundant amine pump (not shown) may be independently affixed to the back-end module 205 as within the scope of ordinary engineering practices. In still further embodiments, the back-end module 205, may be provided with less vessels and equipment, for example without a heat exchanger 140 or without a booster pump 160, as within the scope of ordinary engineering practices.

In an embodiment, the absorption tower 105 may have between about 18 and 40 trays, or equivalent performance. Alternatively, the absorption tower 105 may have about 20 trays, or equivalent performance. In an embodiment, the height of the absorption tower 105 may range from about 25 feet to about 60 feet, and alternatively the height of the absorption tower 105 may be about 52 feet. In an embodiment, the distillation tower 150 may have between about 18 and 40 trays, or equivalent performance. Alternatively, the distillation tower 150 may have about 20 trays, or equivalent performance. In an embodiment, the height of the distillation tower 150 may range from about 25 feet to about 60 feet, and alternatively the height of the distillation tower 150 may be about 52 feet. In a non-limiting embodiment wherein the absorption tower 105 and the distillation tower 150 each have 20 trays, the absorption tower 105 may be feed about the $18^{th}$ tray and the distillation tower 150 may be feed at the $18^{th}$ tray.

In an embodiment, the front-end module 200 and back-end module 205 may form a framework generally formed by at least four steel I-beams, A, B, C, D and E, F, G, H, respectively. Alternatively, the front-end module 200 and back-end module 205 may form a framework generally formed by structures having the requisite strength and durability characteristics, such as a framework defined by hollow or filled piping having heavy sheet steel affixed thereto. The steel I-beams, A, B, C, D may be connected to each other by any standard method including welding, bolting, and the like. Likewise, the steel I-beams, E, F, G, H may be connected to each other by any standard method including welding, bolting, pins, interconnecting plates, and the like. In alternative embodiments, any number of steel I-beams, or other materials, may be used to frame, or otherwise define or form, the front-end module 200 and back-end module 205.

In an embodiment, the front-end module 200 may include pre-fabricated front-end equipment connections 103 such as bases, housings, or other connections 104 suitable for receiving and securing one or more of the vessels, instrumentation, and equipment of the front-end module 200 on the modules 200, or within the perimeter defined by the steel I-beams, A, B, C, and D. In an alternative embodiment, the front-end module 200 may include pre-fabricated front-end equipment connections 103 bases, housings, or other connections 104 suitable for receiving one or more of the vessels, instrumentation, and equipment of the front-end module 200 on the modules 200, or within the perimeter defined by the steel I-beams, A, B, C, and D, and the flash tank 125 may be affixed to an exterior side of the front-end module 200 and to one of the steel I-beams, A, B, C, or D, by pins, bolts, temporary welds, interconnecting plates, and the like. In an embodiment, the back-end module 205 may include pre-fabricated back-end equipment connections 153 bases, housings, or other connections 154 suitable for receiving one or more of the vessels, instrumentation, and equipment of the back-end module 205 within the perimeter defined by the steel I-beams E, F, G, H.

In an embodiment, substantially all of the piping and electrical conduits and/or connections (for example as represented by 107, FIG. 1) are pre-fabricated to and affixed to, or otherwise disposed or affixed within and through, the front-end module 200 prior to arrival at the work site. Likewise, in an embodiment, substantially all of the piping and electrical conduits and/or connections (for example as represented by 157, FIG. 1) are pre-fabricated to and affixed to, or otherwise disposed or affixed within and through, the back-end module 205 prior to arrival at the work site. In this manner, once at the work site, various vessels, instrumentation, equipment, and electrical wiring may be quickly affixed to the front-end module 200 and the back-end module 205. Thus, the front-end module 200 and the back-end module 205 may be brought to a site and the above-described vessels, instrumentation, and equipment may be deployed, installed, or plugged in, and started-up, or played, in less than about seven days, alternatively less than about five days, alternatively less than about 3 days, alternatively, less than about two days, and alternatively less than about one day. In this manner, the front-end module 200 and the back-end module 205 are pre-fabricated and adapted for "plug-and-play" deployment, installation, and start-up, as previously described.

In an embodiment, the front-end module 200 and the back-end module 205, after being set up, i.e., after all of the vessels, instrumentation, and equipment have been deployed and installed, is capable of safely withstanding wind speeds of at least about 70 miles per hour, alternatively at least about 100 miles per hour, alternatively at least about 120 miles per hour. Concrete, or any other suitably heavy material, may be affixed to the steel I-beams, A, B, C, D, alternatively between the respective flanges of I-beams, A, B, C, D, to increase the weight of the front-end module 200. Such concrete, if used, is preferably affixed and cured to the steel I-beams prior to arrival at the work site.

In another embodiment, one or more mass assemblies, M, may be affixed to at least a portion of the steel I-beams A, B, C, D or the steel I-beams E, F, G, and H. The mass assembly, M, may be formed of a bottom plate having a layer of material, preferably concrete, affixed thereto, and a deck affixed to the material layer. Alternatively, the deck may be affixed to the bottom plate through the layer of material. The bottom plate and deck may be formed from steel or any other material having the requisite strength and durability to operate in an amine plant. In an embodiment, the deck may be shaped to form an edge barrier suitable to contain any liquids that escape from the amine plant 500. In a further embodiment, an upper lip of the deck may be flush with an upper portion of the steel I-beams A, B, C, D or the steel I-beams E, F, G, and H, and alternatively the upper lip of the deck may be raised above the upper portion of the steel I-beams A, B, C, D or the steel I-beams E, F, G, and H. The mass assembly, M, may provide the following: weight, prior to installation of the amine plant 500, to increase the bearing potential of the amine plant 500; a platform upon which a worker can stand; and an containment mechanism to prevent accidental liquid releases into the environment. The mass assembly, M, may be located under vessel(s), which have the potential to accidentally release liquid, such as without limitation volatile organic compounds, into the environment.

In an alternative embodiment, guide wires (not shown) may secure the absorption tower 105 to the front-end module 200, and guide wires (not shown) may secure the distillation tower 150 to the back-end module 205, such that the amine plant 500 is capable of safely withstanding wind speeds of about 140 miles per hour, alternatively about 160 miles per hour.

In various embodiments, the total footprint of the front-end module 200 may range from about 100 ft$^2$ to about 1,000 ft$^2$, alternatively from about 250 ft$^2$ to about 600 ft$^2$, alternatively may be about 30 feet by about 12 feet. In an embodiment, the front-end module 200 and the back-end module 205 may each have a width less than about 14 feet, alternatively less than about 20 feet. Alternatively, the front-end module 200 and the back-end module 205 may each be of any size suitable such that they may be each separately trucked to location as a single piece. Moreover, the front-end module 200 and the back-end module 205 may be set-up with at least about 25 feet, alternatively at least about 50 feet, distance between them, as per OSHA requirements.

Figure 3:
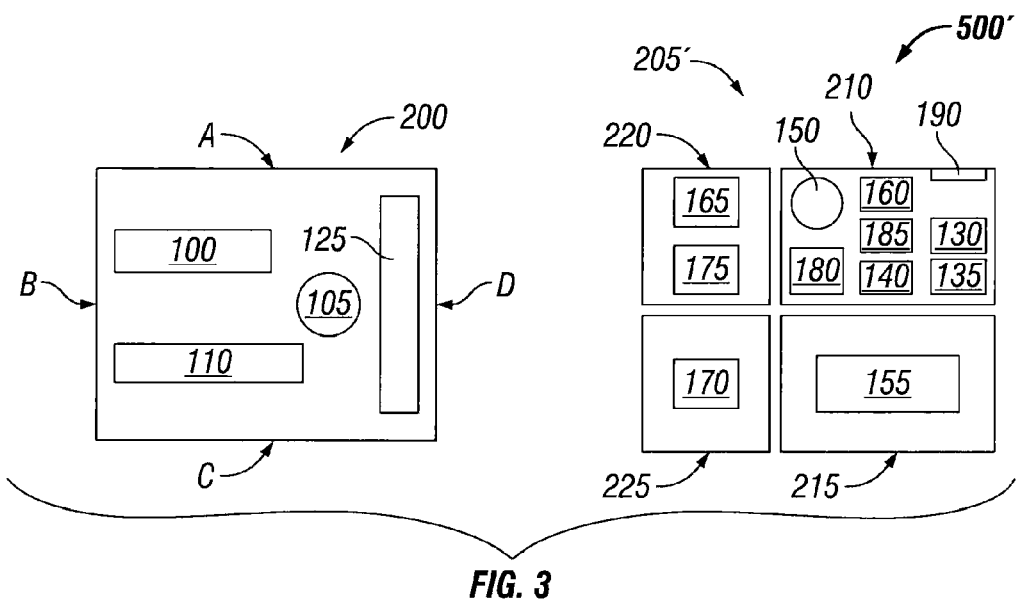
FIG. 3 is a schematic aerial view, or top, of an alternative illustrative embodiment of the present modular amine plant having a front-end module and a back-end module, wherein the back-end module is comprised of four skids.

FIG. 3 is a schematic of an illustrative embodiment of the present modular amine plant, in which amine plant 500' is comprised of two modules: a front-end module 200, and a back-end module 205'. Preferably, the front-end module 200 and the back-end module 205' are in adaptable fluid communication with each other. Each module 200, 205' provides a skid, or skid-mounted frame, for supporting the components of the amine plant 500'. Each module 200, 205' may include a plurality of support members or beams, or I-beams, which form a supporting framework as will be hereinafter described in greater detail. The back-end module 205' may be formed of a distillation skid 210, a reboiler skid 215, a cooling skid 220, and a pump skid 225. In various embodiments disclosed herein, the terms "distillation skid," "reboiler skid," "cooling skid," "pump skid," and the like may mean a skid, preferably framed by steel I-beams, having suitable pre-fabricated equipment connections, as well as piping and electrical conduits and/or connections affixed thereto, suitable for installing and securing at least the adjective unit to the skid. For example, the "distillation skid" is preferably framed by steel I-beams and preferably includes pre-fabricated equipment connections, and piping and electrical conduits and/or connection affixed thereto, suitable for installing and securing at least a distillation tower thereto upon arrival to a work site.

Still with reference to FIG. 3, the amine plant 500' may be of any size necessary to accommodate the desired natural gas production rate at any particular site having a raw natural gas source; however, preferable amine-water blend circulation rates of the amine plant 500' include about 3 gallons per minute, about 7.5 gallons per minute, about 30 gallons per minute, about 60 gallons per minute, about 100 gallons per minute, about 200 gallons per minute, about 300 gallons per minute, about 400 gallons per minute, about 500 gallons per minute, about 600 gallons per minute, about 700 gallons per minute, and about 800 gallons per minute, plus or minus ten percent.

In the embodiment of FIG. 3, the front-end module 200 may be as described above with reference to FIGS. 1 and 2. The distillation skid 210, the reboiler skid 215, the cooling skid 220, and the pump skid 225 may each, independently, form a framework generally formed by at least four steel I-beams, in a similar manner as described above with respect to the front-end module, or front-end process, 200 and back-end module, or back-end process, 205 illustrated in FIGS. 1 and 2.

Continuing with reference to FIG. 3, the distillation skid 210 may have pre-fabricated equipment connections, and piping and electrical conduits and/or connections, suitable for affixing thereto at least an amine stock filter 130, a charcoal filter 135, a heat exchanger 140, a distillation tower 150 having a performance and height equivalent to that as detailed above with respect to FIGS. 1 and 2, a booster pump 160, an accumulator 180, and a reflux pump 185. The distillation skid 210 may further have an electrical power panel 190 affixed thereto.

The electrical power panel 190, which may include an electrical programmable logic controller (not shown), may be affixed to the distillation skid 210 at a relatively far distance from the reboiler skid 215, a relatively far distance from the flash tank 125, and a relatively close distance to the pump skid 225. In an embodiment, the footprint of the back-end module 205' may be minimized by arranging, or aligning, the distillation skid 210, the reboiler skid 215, the cooling skid 220, and the pump skid 225 in a general rectangle, and, at the same time, the electrical power panel 190, which may include an electrical programmable logic controller (not shown), may be affixed to the distillation skid 210 at a relatively far distance from the reboiler skid 215, a relatively far distance from the flash tank 125, and a relatively near distance to the pump skid 225. In a still further embodiment, the electrical power panel 190, which optionally includes an electrical programmable logic controller (not shown), may be affixed at a location in the upper right quadrant of the distillation skid 210.

The reboiler skid 215 may have pre-fabricated equipment connections, and piping and electrical conduits and/or connections, suitable for affixing thereto at least a reboiler 115. The cooling skid 220 may have pre-fabricated equipment connections, and piping and electrical conduits and/or connections, suitable for affixing thereto at least a cooler 165 and a condenser 175. The pump skid 225 may have pre-fabricated equipment connections, and piping and electrical conduits and/or connections, suitable for affixing thereto at least a main pump 170. Further, in an embodiment, the distillation skid 210, the reboiler skid 215, the cooling skid 220, and the pump skid 225 may be removeably affixed to each other using bolts, temporary welds, interconnecting plates, and the like.

In an alternative arrangement, the distillation skid 210, the reboiler skid 215, the cooling skid 220, and the pump skid 225 are aligned in a general rectangular configuration to minimize the footprint of the back-end module 205'. In an embodiment, the distillation skid 210 may be the upper right quadrant of the back-end module 205' footprint, the reboiler skid 215 may be the lower right quadrant of the back-end module 205' footprint, the cooling skid 220 may be the upper left quadrant of the back-end module 205' footprint, and the pump skid 225 may be the lower left quadrant of the back-end module 205' footprint. This arrangement, however, is a relative generalization as the distillation skid 210, the reboiler skid 215, the cooling skid 220, and the pump skid 225 may be of varying sizes, and shapes, and may not form a rectangle.

In various embodiments, the total footprint of the back-end module 205' may range from about 1,000 $ft^2$ to about 4,000 $ft^2$, alternatively from about 2,000 $ft^2$ to about 3,000 $ft^2$, alternatively may be about 85 feet by about 26 feet. In an embodiment, the front-end module 200, the distillation skid 210, the reboiler skid 215, the cooling skid 220, and the pump skid 225 may each have a width less than about 14 feet, alternatively less than about 20 feet. Alternatively the front-end module 200, the distillation skid 210, the reboiler skid 215, the cooling skid 220, and the pump skid 225 may each be of any size suitable such that they may be each separately trucked to location as a single piece.

In an embodiment, substantially all of the piping and electrical conduits and/or connections are pre-fabricated and affixed to, or otherwise disposed or affixed within and through, the front-end module 200, the distillation skid 210, the reboiler skid 215, the cooling skid 220, and the pump skid 225, prior to arrival at the work site. In this manner, once at the work site, various vessels, instrumentation, equipment, and electrical wiring may be quickly affixed to the front-end module 200, the distillation skid 210, the reboiler skid 215, the cooling skid 220, and the pump skid 225. Thus, the front-end module 200, the distillation skid 210, the reboiler skid 215, the cooling skid 220, and the pump skid 225 may be brought to a site and the above-described vessels, instrumentation, and equipment may be deployed, installed, and started-up in less than about seven days, alternatively less than about five days, alternatively less than about 3 days, alternatively, less than about two days, and alternatively less than about one day. In this manner, the front-end module 200 and the back-end module 205' are pre-fabricated and adapted for "plug-and-play" deployment, installation, and start-up, as previously described.

The front-end module 200 and the back-end module 205', after being set up, i.e., after all of the vessels, instrumentation, and equipment have been installed and secured, may be capable of safely withstanding wind speeds of at least about 70 miles per hour, alternative at least about 100 miles per hour, alternatively at least about 120 miles per hour. In an alternative embodiment, guide wires (not shown) may secure the absorption tower 105 to the front-end module 200, and guide wires (not shown) may secure the distillation tower 150 to the distillation skid 210, such that the amine plant 500' is capable of safely withstanding wind speeds of at least about 140 miles per hour, alternatively at least about 160 miles per hour. In an alternative embodiment, one or more containment shields, as described above with respect to FIGS. 1 and 2, may be utilized in connection with the front-end module 200, the distillation skid 210, the reboiler skid 215, the cooling skid 220, and the pump skid 225.

Figure 4:
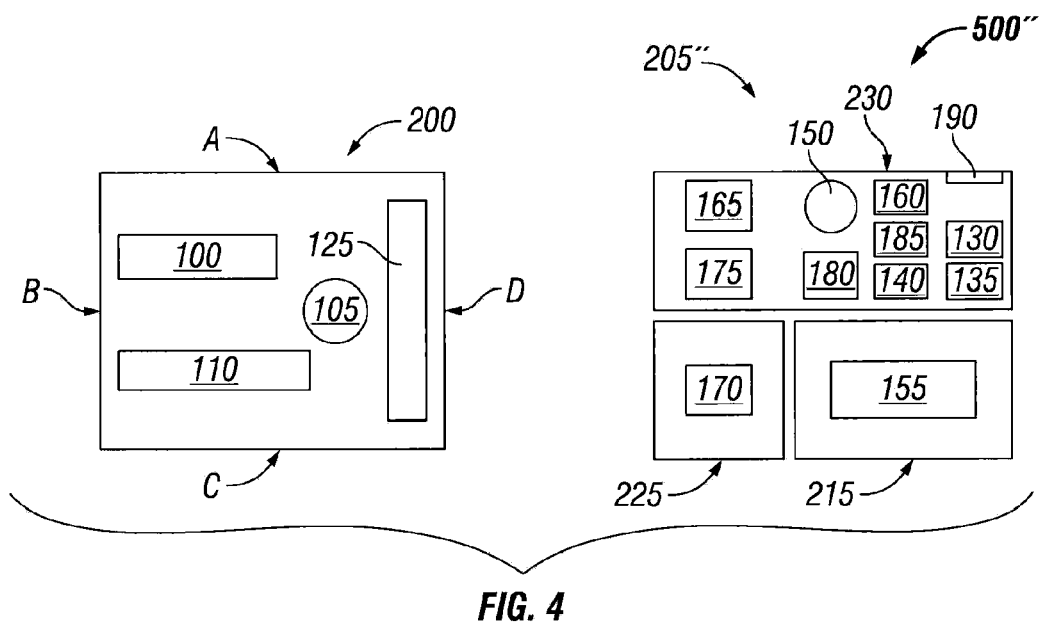
FIG. 4 is a schematic aerial, or top, view of a still further illustrative embodiment of the present modular amine plant having a front-end module and a back-end module, wherein the back-end module is comprised of three skids.

FIG. 4 is a schematic of an illustrative embodiment of the present modular amine plant, in which amine plant 500" is comprised of two skids: a front-end module 200, a back-end module 205", wherein the back-end module 205" may include a distillation skid, otherwise referred to as an alternative distillation skid, 230, a reboiler skid 215, and a pump skid 225.

The amine plant 500" may be of any size necessary to accommodate the desired natural gas production rate at any particular site having a raw natural gas source; however, preferable amine-water blend circulation rates of the amine plant 500" include about 3 gallons per minute, about 7.5 gallons per minute, about 30 gallons per minute, about 60 gallons per minute, about 100 gallons per minute, about 200 gallons per minute, about 300 gallons per minute, about 400 gallons per minute, about 500 gallons per minute, about 600 gallons per minute, about 700 gallons per minute, and about 800 gallons per minute, plus or minus ten percent.

In this embodiment, the front-end module 200 may be as described above with reference to FIGS. 1 and 2. The distillation skid 230, the reboiler skid 215, and the pump skid 225 may, independently, each form a framework generally formed by at least four steel I-beams, in a similar manner as described above with respect to the front-end process module 200 and back-end process module 205 illustrated in FIGS. 1 and 2. In an alternative embodiment, one or more containment shields, as described above with respect to FIG. 3, may be utilized in connection with the front-end module 200, the distillation skid 230, the reboiler skid 215, and the pump skid 225.

Continuing with reference to FIG. 4, the distillation skid 230 may have pre-fabricated equipment connections, and piping and electrical conduits and/or connection affixed thereto, suitable for affixing thereto an amine stock filter 130, a charcoal filter 135, a heat exchanger 140, a distillation tower 150, a booster pump 160, an accumulator 180, a reflux pump 185, a cooler 165, and a condenser 175. The distillation skid 230 may further have affixed thereto an electrical power panel 190.

The electrical power panel 190, which may include an electrical programmable logic controller (not shown), may be affixed to the distillation skid 230 at a relatively far distance from the reboiler skid 215, a relatively far distance from the flash tank 125, and a relatively close distance from the pump skid 225. In an embodiment, the footprint of the back-end module 205" may be minimized by arranging, or aligning, the distillation skid 230, the reboiler skid 215, and the pump skid 225 skids in a general rectangle, and, at the same time, the electrical power panel 190, which may include an electrical programmable logic controller (not shown), may be affixed to the distillation skid 230 at a relatively far distance from the reboiler skid 215, a relatively far distance from the flash tank 125, and a relatively near distance from the pump skid 225. In a still further embodiment, the electrical power panel 190, which optionally includes an electrical programmable logic controller (not shown), may be affixed at a location in the upper right quadrant of the distillation skid 230.

The reboiler skid 215 may have pre-fabricated equipment connections, and piping and electrical conduits and/or connections, suitable for affixing thereto at least a reboiler 115. The pump skid 225 may have pre-fabricated equipment connections, and piping and electrical conduits and/or connections, suitable for affixing thereto at least a main pump 170. Further, in an embodiment, the distillation skid 230, the reboiler skid 215, and the pump skid 225 may be removeably affixed to each other using bolts, temporary welds, interconnecting plates, and the like.

In an alternative arrangement, the distillation skid 230, the reboiler skid 215, and the pump skid 225 are aligned in a general rectangular configuration to minimize the footprint of the back-end module 205". In an embodiment, the distillation skid 230 may be the upper right and left quadrants of the back-end module 205" footprint, the reboiler skid 215 may be the lower right quadrant of the back-end module 205" footprint, and the pump skid 225 may be the lower left quadrant of the back-end module 205" footprint. This arrangement is, however, a relative generalization as the distillation skid 230, the reboiler skid 215, and the pump skid 225 may be of varying sizes, and shapes, and may not form a rectangle.

In various embodiments, the total footprint of the back-end module 205" may range from about 1,000 $ft^2$ to about 4,000 $ft^2$, alternatively from about 2,000 $ft^2$ to about 3,000 $ft^2$, alternatively may be about 85 feet by about 26 feet. In an embodiment, the front-end module 200, the distillation skid 230, the reboiler skid 215, and the pump skid 225 may each have a width less than about 14 feet, alternatively less than about 20 feet. Alternatively the front-end module 200, the distillation skid 230, the reboiler skid 215, and the pump skid 225 may each be of any size suitable such that they may be each separately trucked to location as a single piece.

In an embodiment, substantially all of the piping and electrical conduits and/or connections are pre-fabricated and affixed to, or otherwise disposed or affixed within and through, the front-end module 200, the distillation skid 230, the reboiler skid 215, and the pump skid 225, prior to arrival at the work site. In this manner, once at the work site, various vessels, instrumentation, equipment, and electrical wiring may be quickly affixed to the front-end module 200, the distillation skid 230, the reboiler skid 215, and the pump skid 225. Thus, the front-end module 200, the distillation skid 230, the reboiler skid 215, and the pump skid 225 may be brought to a site and their above-described vessels, instrumentation, and equipment may be installed in less than about seven days, alternatively less than about five days, alternatively less than about 3 days, alternatively, less than about two days, and alternatively less than about one day. In this manner, the front-end module 200 and the back-end module 205' are pre-fabricated and adapted for "plug-and-play" deployment, installation, and start-up, as previously described.

In an embodiment, the front-end module 200 and the back-end module 205", the reboiler skid 215, the cooling skid 220, and the pump skid 225, after being set up, i.e., after all of the vessels, instrumentation, and equipment have been installed and secured, is capable of safely withstanding wind speeds of at least about 70 miles per hour, alternative at least about 100 miles per hour, alternatively at least about 120 miles per hour. In an alternative embodiment, guide wires (not shown) may secure the absorption tower 105 to the front-end module 200, and guide wires (not shown) may secure the distillation tower 150 to the back-end module 205", such that the amine plant 500 is capable of safely withstanding wind speeds of at least about 140 miles per hour, alternatively at least about 160 miles per hour.

Figure 5:
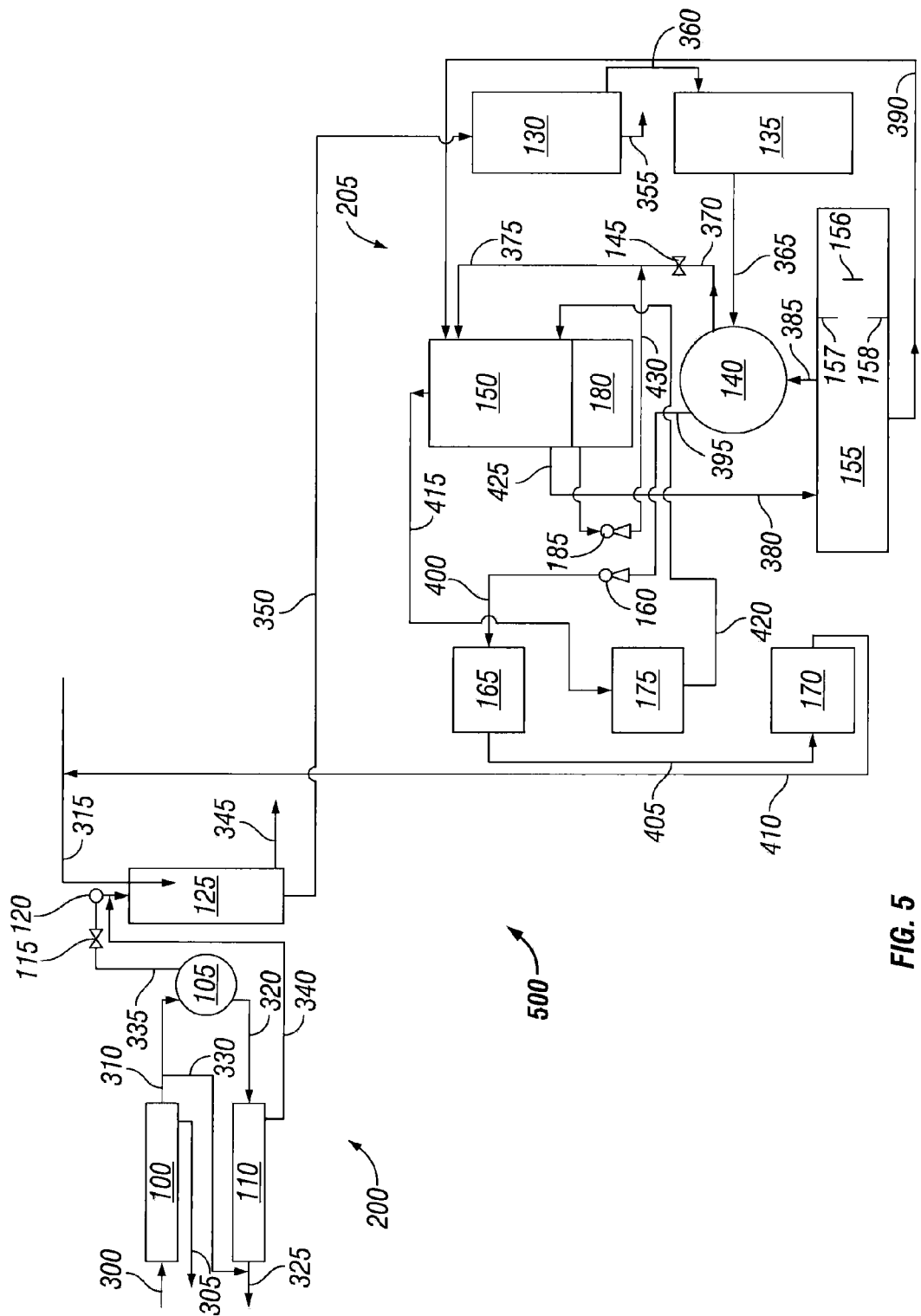
FIG. 5 is a schematic illustrating an embodiment of a piping and equipment design of the illustrative embodiment of the present modular amine plant of FIG. 4.

With reference to FIG. 5, a schematic is provided illustrating an embodiment of various piping and equipment connections as applicable to any of the amine plants 500, 500', and 500", disclosed herein; however, for brevity FIG. 5 is discussed with reference to the nomenclature of FIGS. 1 and 2. Still with reference to FIG. 5 and in an embodiment, raw natural gas may be fed through a feed line 300 into a filter 100. Solid and liquid particulates may exit the filter 100 through the particulate line 305. A first natural gas may exit the filter 100 through a first absorption tower inlet line 310 and the first natural gas may enter a lower portion of an absorption tower 105. An amine, for example methyl diethanolamine, diethanolamine, or a mixture containing an amine, may enter an upper portion of the absorption tower 105 through a second absorption tower inlet line 315. The amine and the first natural gas may contact within the absorption tower 105 and a second natural gas may exit the absorption tower 105 through a first absorption tower outlet line 320 and into a scrubber 110. Within the scrubber 110, the second natural gas may be further purified, or otherwise refined or processed, and may exit the scrubber 100 through a first scrubber outlet line 325. An optional bypass line 330 may permit the first natural gas to bypass both the absorption tower 105 and the scrubber 110, and enter the scrubber outline line 325.

An amine rich fluid containing liquid hydrogen sulfide and liquid carbon dioxide may exit the absorption tower 105 through a second absorption tower outlet line 335, through an optional block valve 115, through an optional orifice plate 120, and into a flash tank 125. Optionally, overflow natural gas, or rich natural gas, may exit the scrubber 110 through a second scrubber outlet line 340 and either join the second absorption tower outline line 335 after the block valve 115 and the orifice plate 120, or enter the flash tank 125 directly. The flash tank 125 may have a relief valve (not shown). Methane gas, and other combustible gases, may exit the flash tank 125 through a first flash tank outlet line 345, and may be used as fuel. Liquid phase amine rich fluid may flow from the flash tank 125 through a first filter inlet line 350 and into an amine stock filter 130.

The amine stock filer 130 may separate solid and liquid particulates from the liquid phase amine rich fluid and the solid and liquid particulates may exit through a first amine stock outlet line 355. The liquid phase amine rich fluid may flow from the amine stock filer 130 through a second amine stock outline line 360 and into a charcoal filter 135. The liquid phase amine rich fluid may continue to flow from the charcoal filter 135 through a charcoal filter outlet line 365 into a heat exchanger 140.

The heat exchanger 140 may heat the liquid phase amine rich fluid and the warm, heated amine rich fluid may exit through a first heat exchanger exit line 370 into a first valve 145. In an embodiment, the warm, heated amine rich fluid exiting the each exchanger 140 is in liquid phase, and undergoes a partial phase change across the first valve 145. In an embodiment, the heated amine rich fluid existing the first valve 145 is 30 percent, by weight, gas, and flows through a first distillation tower inlet line 375 into a distillation tower 150. The heated amine rich fluid may be further heated as it flows down the distillation tower 150 from about 200° F. to about 290° F. Liquid amine, otherwise referred to herein as bottom distillate fluid, may exit a lower portion of the distillation tower 150 through a first distillation outlet line 380 and into a reboiler 155.

The reboiler 155 may have a heat flux of about 7,500 btu per square feet per hour. In an embodiment, the reboiler 155 may have three wiers: a dampening wier 156, a level wier 157, and a splash wier 158. The three wiers 156, 157, and 158 may located near a rear end of the reboiler 155. Without wishing to be bound by the theory, Applicants believe that the least three wiers are useful in keeping the fire level above the fire tubes and preventing waves of heat, or hot spots, along the reboiler 155, which assists in minimizing or preventing cracking of the amine within the reboiler 155. Lean amine may flow from the reboiler 155 to the heat exchanger 140 through a first reboiler outlet line 385. In an embodiment, the temperature of the lean amine within the first reboiler outlet line 385 is about 260° F. to about 300° F. Steam may flow from the reboiler 155 to the distillation tower 150 through a second reboiler outlet line 390.

The lean amine may flow from the heat exchanger 140 to a booster pump 160 through a second heat exchanger outlet line 395. Preferably, a redundant booster pump (not shown) is provided to ensure continued operation of the amine plant 500. The lean amine may continue to flow from the booster pump 160 through a cooler inlet line 400 into a cooler 165. The lean amine may continue to flow from the cooler 165 to a main pump 170 through a main pump inlet line 405. In an embodiment, the main pump 170 increases the pressure of the lean amine by about 1000 psig, alternatively from about 80 psig to about 1100 psig. The high pressure, lean amine may flow from the main pump 170 through a regeneration line 410 into the separation tower inlet line 315.

Gaseous upper distillate fluid may exit near the top of the distillation tower 150 and flow into a condenser 175 through a second distillation tower outlet line 415. Liquid distillate may flow from the condenser 175 into the accumulator 180 through a condenser outlet line 420. The liquid distillate may exit the accumulator 180 and flow into a reflux pump 185 through an accumulator outlet line 425. Preferably, a redundant reflux pump (not shown) is provided to ensure continued operation of the amine plant 500. The liquid distillate may continue to flow from the reflux pump 185 into the first distillation tower inlet line 375 through a reflux pump outlet line 430.

In an embodiment, an industrial thermometer, thermal couple, or the like, measures the temperature of the distillate in the second distillation tower outlet line 415. This temperature measurement may be converted into an electrical signal and provided to both a condenser controller (not shown) and a reboiler controller (not shown). The condenser controller (not shown) controls the amount of heat taken out of the distillate before the distillate exits the condenser 175 through the condenser outlet line 420. The reboiler controller (not shown) controls the amount of heat put into the reboiler 155 and the amount of heat put into the lean amine within the first reboiler outlet line 385. Accordingly, in this embodiment, a signal control point, the temperature of the distillate within the second distillation tower outlet line 415 is controlled by two controllers, a condenser controller (not shown) and a reboiler controller (not shown). Without wishing to be bound by the theory, Applicants believe that efficient dual control of a signal control point because of the phase shift of distillate across the condenser 175.

Specific embodiments of the present modular amine plant have been described and illustrated. It will be understood to those skilled in the art that changes and modifications may be made without departing from the spirit and scope of the inventions defined by the appended claims.

The invention claimed is:

1. A method of installing a modular amine plant comprising:
    providing to a site a front-end module having a filter affixed to the front-end skid, an absorption tower affixed to the front-end skid, and a flash tank affixed to the front-end skid, wherein the filter, absorption tower, and flash tank are in adaptable fluid communication with each other prior to arrival at the site;
    providing to the site a back-end module in adaptable fluid communication with the front-end module, the back-end module having a heat exchanger affixed to the back-end skid, a distillation tower affixed to the back-end skid, and a reboiler affixed to the back-end skid, wherein the heat exchanger, the distillation tower, and the reboiler are in adaptable fluid communication with each other prior to arrival at the site; and
    starting up the modular amine plant in less than about 5 days.

2. A method of installing a modular amine plant comprising:
    providing to a site a front-end module having a filter affixed to the front-end module, an absorption tower affixed to the front-end module, a scrubber affixed to the front-end module, and a flash tank affixed to the front-end module, wherein the filter, absorption tower, and flash tank are in adaptable fluid communication with each other prior to arrival at the site;
    providing a back-end module in adaptable fluid communication with the front-end having:
        a distillation skid having a distillation tower affixed to the distillation skid, a heat exchanger affixed to the distillation skid, a condenser affixed to the distillation skid, wherein the heat exchanger and the distillation tower are in substantial fluid communication with each other prior to arrival at the site;
        a reboiler skid having a reboiler affixed to the reboiler skid;
        a pump skid having a main pump affixed to the pump skid; and starting up the modular amine plant in less than about 5 days.

3. The method of claim 2, wherein the modular amine plant is set up in less than about 2 days.

4. The method of claim 1, wherein the modular amine plant has moment forces sufficient to withstand wind speeds of at least about 120 miles per hour.

5. The method of claim 4, wherein a total footprint of the back-end module is less than about 3,000 ft$^2$.

6. The method of claim 2, wherein the modular amine plant has moment forces sufficient to withstand wind speeds of at least about 120 miles per hour.

7. The method of claim 6, wherein a total footprint of the back-end module is less than about 3,000 ft$^2$.

8. The method of claim 1, wherein the modular amine plant is sized to accommodate an amine-water circulation rate selected from the group consisting of about 3 gallons per minute, about 7.5 gallons per minute, about 30 gallons per minute, about 60 gallons per minute, about 100 gallons per minute, about 110 gallons per minute, about 200 gallons per minute, about 300 gallons per minute, about 400 gallons per minute, about 500 gallons per minute, about 600 gallons per minute, and about 700 gallons per minute, plus or minus ten percent.

9. The method of claim 2, wherein the modular amine plant is sized to accommodate an amine-water circulation rate selected from the group consisting of about 3 gallons per minute, about 7.5 gallons per minute, about 30 gallons per minute, about 60 gallons per minute, about 100 gallons per minute, about 110 gallons per minute, about 200 gallons per minute, about 300 gallons per minute, about 400 gallons per minute, about 500 gallons per minute, about 600 gallons per minute, and about 700 gallons per minute, plus or minus ten percent.

10. A method of installing a modular amine plant comprising:
    providing to a site a front-end module having a filter affixed to the front-end skid, an absorption tower affixed to the front-end skid, and a flash tank affixed to the front-end skid, wherein the filter, absorption tower, and flash tank are in adaptable fluid communication with each other prior to arrival at the site;
    providing to the site a back-end module in adaptable fluid communication with the front-end module, the back-end module having a heat exchanger affixed to the back-end skid, a distillation tower affixed to the back-end skid, and a reboiler affixed to the back-end skid, wherein the heat exchanger, the distillation tower, and the reboiler are in adaptable fluid communication with each other prior to arrival at the site; and
    starting up the modular amine plant in less than about 7 days.

11. The method of claim 10, wherein the modular amine plant has moment forces sufficient to withstand wind speeds of at least about 120 miles per hour.

12. The method of claim 11, wherein a total footprint of the back-end module is less than about 3,000 ft$^2$.

13. The method of claim 10, wherein the modular amine plant is sized to accommodate an amine-water circulation rate selected from the group consisting of about 3 gallons per minute, about 7.5 gallons per minute, about 30 gallons per minute, about 60 gallons per minute, about 100 gallons per minute, about 110 gallons per minute, about 200 gallons per minute, about 300 gallons per minute, about 400 gallons per minute, about 500 gallons per minute, about 600 gallons per minute, and about 700 gallons per minute, plus or minus ten percent.

\* \* \* \* \*